(12) United States Patent
Claudet

(10) Patent No.: US 6,742,742 B2
(45) Date of Patent: Jun. 1, 2004

(54) DEVICE AND PROCESS FOR REGULATING THE POWER OF THE ENGINES OF A ROTARY WING MULTI-ENGINE AIRCRAFT

(75) Inventor: Vincent Claudet, Saint Agne (FR)

(73) Assignee: Eurocopter, Marignane Cedex (FR)

( * ) Notice: Subject to any disclaimer, the term of this patent is extended or adjusted under 35 U.S.C. 154(b) by 59 days.

(21) Appl. No.: 10/144,760

(22) Filed: May 15, 2002

(65) Prior Publication Data

US 2002/0171005 A1 Nov. 21, 2002

(30) Foreign Application Priority Data

May 16, 2001 (FR) .......................................... 01 06442

(51) Int. Cl.$^7$ ............................................. B64D 39/00
(52) U.S. Cl. ................ 244/17.13; 244/76 R; 60/39.15; 60/39.28; 701/99
(58) Field of Search .......................... 244/76 R, 17.11, 244/17.13; 60/39.15, 39.281, 39.24, 224; 701/99; 416/35, 38, 44, 33

(56) References Cited

U.S. PATENT DOCUMENTS

| 3,174,284 | A | * | 3/1965 | McCarthy | 244/17.13 |
|---|---|---|---|---|---|
| 3,811,273 | A | * | 5/1974 | Martin | 60/39.281 |
| 3,875,390 | A |   | 4/1975 | Eccles et al. | |
| 3,969,890 | A | * | 7/1976 | Nelson | 60/39.281 |
| 4,296,601 | A | * | 10/1981 | Martin | 60/224 |
| 4,303,976 | A |   | 12/1981 | Joby | |
| 4,785,403 | A | * | 11/1988 | Kuhlberg | 701/99 |
| 4,875,168 | A | * | 10/1989 | Martin | 60/39.281 |
| 5,165,240 | A | * | 11/1992 | Page et al. | 701/99 |
| 5,363,317 | A | * | 11/1994 | Rice et al. | 701/99 |
| 5,440,490 | A | * | 8/1995 | Summerfield | 701/99 |

FOREIGN PATENT DOCUMENTS

JP          932581          2/1997

OTHER PUBLICATIONS

Search Report dated Feb. 1, 2002.
Claveau, Frealle, "Advanced Fuel Control System for Turboshaft Engines," Proceedings of the 52$^{nd}$ Annual Forum of the American Helicopter Society, vol. 2, ppgs. 1644–1651, Jun. 4, 1996.

* cited by examiner

Primary Examiner—Galen L. Barefoot
(74) Attorney, Agent, or Firm—Stevens, Davis, Miller & Mosher, LLP

(57) ABSTRACT

Device and process for regulating the power of the engines of a rotary wing multi-engine aircraft.

The regulating device (1) comprises, in addition to main regulating systems (2, 6) associated with the engines (M1, M2) of the aircraft, auxiliary regulating systems (12, 13) associated with said engines (M1, M2) and means (10, 11) for determining the speeds of rotation of the engines (M1, M2). Each auxiliary regulating system (12, 13) is capable of automatically adjusting the flow rate of fuel in such a way as to slave the speed of rotation of the associated engine, when its main regulating system has failed, to the speed of rotation of the other engine of the aircraft.

12 Claims, 2 Drawing Sheets

DEVICE AND PROCESS FOR REGULATING THE POWER OF THE ENGINES OF A ROTARY WING MULTI-ENGINE AIRCRAFT

FIELD OF THE INVENTION

The present invention relates to a device and a process for regulating the power of the engines of a rotary wing aircraft, in particular a helicopter, which is multi-engine, in particular twin engine.

STATE OF THE ART

It is known that such a regulating device comprises main regulating systems associated respectively with said engines of the aircraft and intended to supply fuel to the respective associated engines, in particular so as to maintain, in flight, the speed of rotation of the main forward propulsion and lift rotor at a substantially constant value.

Moreover, backup devices are known which are associated respectively with said main regulating systems and which make it possible, should there be a fault with one of said main regulating systems, to adjust the power delivered by the associated engine in such a way as to satisfy the requirements corresponding to the maneuvers which the aircraft is currently carrying out.

However, these known backup devices are of manual type and require, at each instant, manual adjustment of the flow rate of the fuel on the part of the pilot.

This therefore increases the pilot's workload. Furthermore, because of the difficulty of adjustment during flight, the pilot requires particular training. Additionally, in particular in order to reduce the risks which could result from insufficient training of the pilot, appropriate means are provided, so that such a backup device is generally very complex and expensive.

The object of the present invention is to remedy these drawbacks. It relates to an especially simple and effective device for regulating the power of the engines of a rotary wing aircraft, in particular a helicopter furnished with at least two engines.

To this end, according to the invention, said regulating device, comprising main regulating systems associated respectively with said engines and intended to supply fuel to the associated engines respectively, is noteworthy in that it furthermore comprises auxiliary regulating systems associated respectively with said engines, and means for determining the speeds of rotation of said engines, and in which each of said auxiliary regulating systems comprises:

- at least one triggering means for triggering said auxiliary regulating system, when the main regulating system of the associated engine has failed;
- a controllable supply means which is capable of supplying fuel to the associated engine; and
- a control means capable of automatically controlling said supply means so as to adjust the fuel flow rate in such a way as to slave the speed of rotation of the engine, whose main regulating system has failed, to the speed of rotation of the other engine of the aircraft (or of another engine of the aircraft when it comprises more than two engines).

Thus, by virtue of the invention, should there be a fault with the main regulating system, the means of supply of the corresponding auxiliary regulating system is controlled automatically so as to regulate the power of the associated engine, thereby decreasing the workload of the pilot since the latter no longer needs to adjust the fuel flow rate manually. Additionally, by virtue thereof, it is not necessary to provide specific training for the pilot.

Furthermore, as will be seen in greater detail hereinbelow, the regulating device in accordance with the invention is especially simple and robust, and inexpensive.

In a preferred embodiment, at least one of said supply means comprises an electric actuator, which comprises for example a DC motor or a stepper motor, and a fuel metering valve.

Advantageously, said fuel metering valve comprises an anti-shutdown stop of standard type. This makes it possible to decelerate the engine without risk of shutdown. It is conceivable to envisage one and the same metering valve for the main regulating system and the auxiliary regulating system which are associated with one and the same engine.

Within the framework of the present invention, each of said triggering means is:

- either manual (on switch), so that an action from the pilot is required in case of a failure, but only in order to trigger the auxiliary regulating system, the control of the flow rate being achieved automatically of course when said auxiliary regulating system (or backup system) is triggered;
- or automatic. This avoids the need for the pilot to release the controls in order to switch on the auxiliary regulating system. If all the triggering means are automatic, the power regulating device in accordance with the invention comprises no manual control.

Moreover, advantageously, at least one of said auxiliary regulating systems furthermore comprises a display means capable of depicting on a display screen the state of said auxiliary regulating system.

The present invention also relates to a process for regulating the power of the engines of a rotary wing aircraft, in particular a helicopter which is furnished with at least two engines, each of which comprises a main regulating system.

This regulating process is noteworthy, according to the invention, in that when one of said main regulating systems has failed, the flow rate of fuel which is fed to the engine, whose main regulating system has failed, is controlled automatically by way of an auxiliary regulating system in such a way as to slave the speed of rotation NG1 of this engine to the speed of rotation NG2 of the other engine (whose main regulating system has not failed).

Advantageously, the flow rate of fuel is controlled in such a way that the increase or the decrease in said flow rate is variable and varies as a function of the discrepancy between the speed of rotation NG1 and the speed of rotation NG2. This enables the following twofold objective to be satisfied

- slow increasing or decreasing of the fuel flow rate near the preset range, so as to ensure the stability of the auxiliary regulating system with regard to slight disturbances; and
- fast increasing or decreasing of the fuel flow rate far from the preset range.

In a preferred embodiment, to slave the speed of rotation NG1 to the speed of rotation NG2:

the following expression E is determined:

$$E=NG1+K.dNG1/dt$$

in which:
K is a predetermined parameter; and
$dNG1/dt$ is the derivative with respect to time of the speed of rotation NG1;
this expression E is compared with thresholds which are defined on the basis of the speed of rotation NG2; and the slaving to be carried out is deduced on the basis of this comparison.

The introduction of a differentiation parameter dNG1/dt makes it possible to ensure anticipation with regard to the crossing of the thresholds by the speed NG1. Moreover, the order delivered is clipped so as to guarantee that the engine controlled by the auxiliary regulating system is maintained within a normal operating range in flight.

Additionally, in a variant embodiment, the fuel flow rate is controlled as follows:

in a case a), for which the following conditions hold simultaneously:
NG2>60% and NG1>75%,
$\Delta=(|NG2-NG1|+0.9d|NG2-NG1|/dt)>1\%$
d/dt being the derivative with respect to time, and
(NG2-NG1)<0,
the fuel flow rate is reduced;

in a case b), for which the following conditions hold simultaneously:
NG2>70% and NG1>75%,
$\Delta=(|NG2-NG1|+0.9d|NG2-NG1|/dt)>1\%$, and
(NG2-NG1)>0,
the fuel flow rate is increased; and otherwise, in a case c), the fuel flow rate is maintained at the value which it had upon the appearance of said failure.

In this variant embodiment, preferably, the fuel flow rate is controlled by controlling the speed of rotation of an electric actuator which is associated with a fuel metering valve and, for case a), in order to reduce the fuel flow rate, a speed of rotation of the electric actuator of substantially 9°/s is ordered if the discrepancy $\Delta$ is greater than 3% and a speed of rotation of the electric actuator of substantially 3°/s is ordered if the discrepancy $\Delta$ is less than or equal to 3%, and for case b) in order to increase the fuel flow rate, a speed of rotation of the electric actuator of substantially 3°/s is ordered.

Furthermore, more especially although not exclusively, said fuel metering valve is common to a main regulating system and an auxiliary regulating system which are associated.

The figures of the appended drawing will elucidate the manner in which the invention may be embodied. In these figures, identical references designate similar elements.

Figure 1:
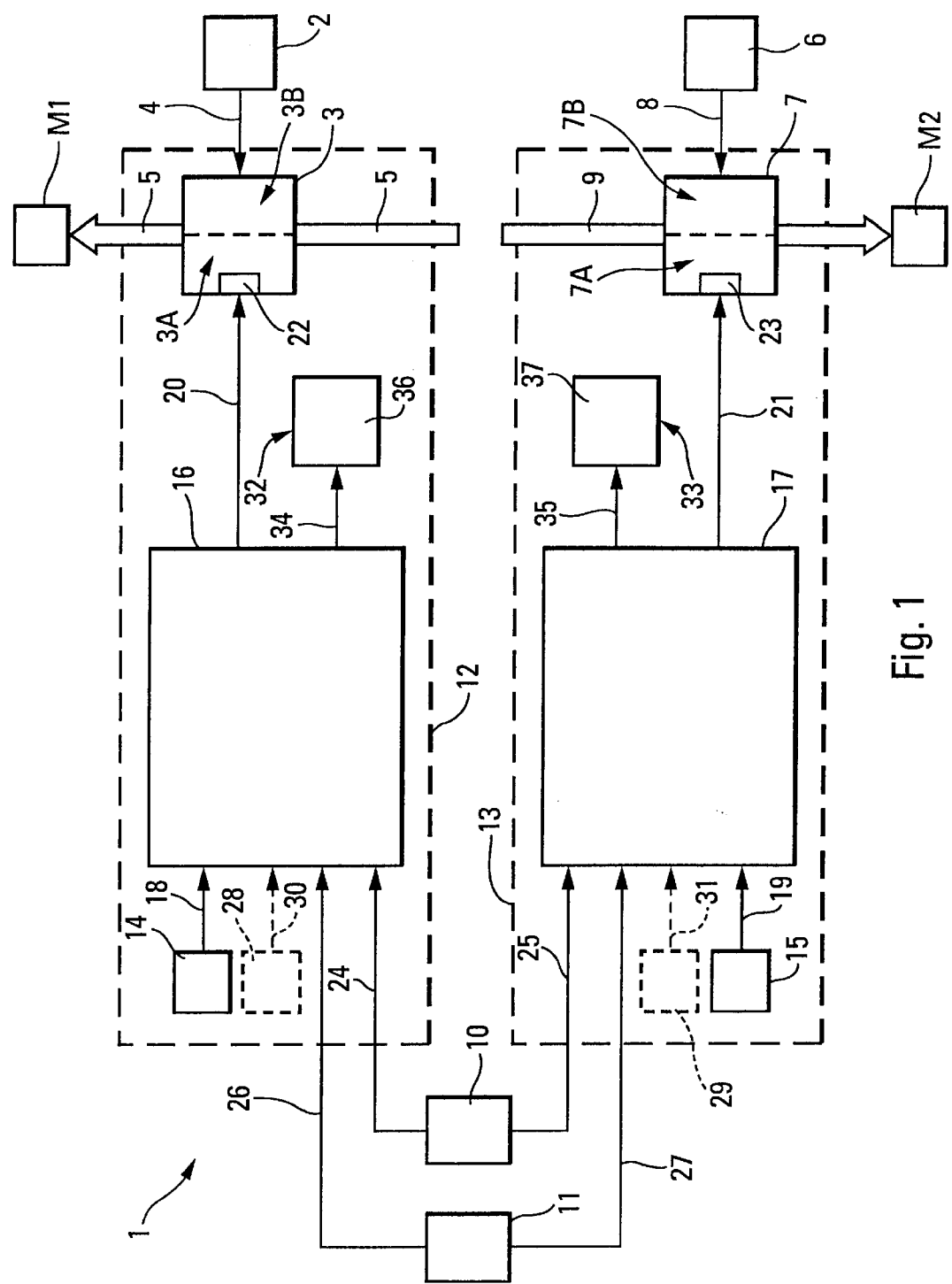
FIG. 1 is the schematic diagram of a power regulating device in accordance with the invention.

The regulating device 1 in accordance with the invention and represented diagrammatically in FIG. 1 is intended for regulating the power of the engines M1 and M2 of a rotary wing aircraft, in particular of a helicopter which is furnished with two engines M1 and M2.

In a known manner, this regulating device 1 comprises:
a first standard main regulating system 2, preferably of the "fail-freeze" known type, which acts on a supply means 3 by way of a link 4. This supply means 3 is capable of adjusting the flow rate of fuel traveling through a pipe 5, partially represented, and intended for supplying the engine M1; and
a second standard main regulating system 6, preferably of the so-called "fail-freeze" type, which acts on a supply means 7 by way of a link 8. This supply means 7 is capable of adjusting the flow rate of fuel traveling through a pipe 9, partially represented, and intended for supplying the engine M2.

The standard objective of such main regulating systems 2 and 6 is to supervise the fuel flow rates of the engines M1, M2 in such a way as to maintain, during the flight, the speed of rotation NR of the rotor of the rotary wing, in particular the main forward propulsion and lift rotor of a helicopter, substantially equal to a preset value, while ensuring power balance between the two engines M1 and M2.

According to the invention, the regulating device 1 moreover comprises:
a means 10 of standard type, for example a sensor, for determining the speed of rotation NG1 of the engine M1, that is to say the output NG1 of the gas generator of said engine M1;
a means 11 of standard type, for example a sensor, for determining the speed of rotation NG2 of the engine M2, that is to say the output NG2 of the gas generator of said engine M2;
a first auxiliary regulating system 12 which is associated with the engine M1 and which is intended for supervising the flow rate of the fuel fed to the latter when the main regulating system 2 associated therewith has failed; and
a second auxiliary regulating system 13 which is associated with the engine M1 and which is intended to supervise the flow rate of the fuel fed to the latter when the main regulating system 6 associated therewith has failed.

According to the invention, each of said auxiliary regulating systems 12, 13 comprises:
at least one triggering means 14, 15, for triggering said auxiliary regulating system 12, 13, when the main regulating system 2, 6 of the associated engine M1, M2 has failed;
a controllable supply means 3, 7 which is capable of supplying fuel to the associated engine M1, M2; and
a control means 16, 17 which is connected by a link 18, 19 to the triggering means 14, 15, by a link 20, 21, to the supply means 3, 7, by a link 24, 25 to the means 10 and by a link 26, 27 to the means 11, and which is capable of automatically controlling said supply means 3, 7 so as to adjust the fuel flow rate in such a way as to slave the speed of rotation of the engine, whose main regulating system has failed, to the speed of rotation of the other engine of the aircraft whose main regulating system is assumed not to have failed.

Consequently, each of said auxiliary regulating systems 12, 13 is a backup system which aims to align the power of the engine which it controls with that of the other engine which is assumed, for its part, to be controlled by its main regulating system. This power balance is achieved by slaving the speed of rotation of the engine controlled by the backup system to the speed of rotation of the other engine.

The backup system or auxiliary regulating system in accordance with the invention is used whenever a failure occurs in the main regulating system of the same engine. In this case, it is known that, for main regulating systems 2, 6 of the "fail-freeze" type, the fuel flow rate (metered by the supply means which is controlled by the main regulating system) remains frozen at its value at the moment of the failure. Also, to maintain the speed of rotation NR of the rotor substantially equal to its preset value, the main regulating system which has not failed controls, in this case, the associated engine in such a way that the latter increases or reduces its power so as to obtain the appropriate speed of rotation NR. Moreover, according to the invention, the auxiliary regulating system of the other engine (the faulty one) then aligns its speed of rotation with that of this engine.

For example, if the main system 2 of the engine M1 has failed, the main system 6 of the engine M2 controls the flow rate of the fuel of the latter engine M2 in such a way that the speed of rotation NR of the rotor driven by the engines M1 and M2 remains substantially equal to its preset value. Moreover, the backup system 12 of the engine M1 controls the flow rate of the fuel of the latter engine M1 in such a way that its speed of rotation NG1 is slaved to the speed of rotation NG2 of said engine M2.

Thus, by virtue of the invention, should there be a fault with a main regulating system 2, 6, the supply means 3, 7 of the corresponding auxiliary regulating system 12, 13 is controlled automatically so as to regulate the power of the associated engine, thereby decreasing the workload of the pilot since the latter no longer has to adjust the flow rate of fuel manually. Moreover, it is therefore not necessary to provide specific training for the pilot.

Furthermore, as will be seen in greater detail hereinbelow, the regulating device 1 according to the invention is especially simple and robust.

Each supply means 3, 7 comprises an electric actuator 22, 23, for example a DC motor or a stepper motor, which is controlled by the control means 16, 17 and which acts on a fuel metering valve 3A, 7A which is generally distinct from the fuel metering valve 3B, 7B controlled by way of the main regulating system 2, 6. The electric actuator 22, 23 brings about a speed of rotation of the fuel metering valve 3A, 7A, which in the case of a DC motor is proportional to the control voltage delivered by the control means 16, 17 and applied to its terminals (this proportionality does not hold for a stepper motor).

Each fuel metering valve 3A, 7A is driven in rotation by the electric actuator 22, 23 so that, when it is driven in one direction, it increases the fuel flow rate (and hence the power), and when it is driven in the other direction, it reduces the fuel flow rate (and hence the power).

Moreover, each fuel metering valve 3A, 7A comprises an integrated anti-shutdown stop (not represented), thereby making it possible to ensure absence of shutdown of the engine M1, M2 when it is controlled by the auxiliary regulating system 12, 13.

Furthermore, with each fuel metering valve 3A, 7A is associated a position sensor (not represented) which indicates the direction in which the actuator 22, 23 must turn in order, if necessary, to allow the metering valve 3A, 7A controlled by the auxiliary regulating system 12, 13 to return to its "neutral" position, that is to say the one where it does not impede the operation of the main regulating system 2, 6.

Additionally, according to the invention, each control means 16, 17 specified hereinbelow comprises an electronic card for formulating the order:
- which brings about the aforesaid control voltage, which is transmitted to the electric actuator 22, 23; and
- which is also capable of ensuring return to normal mode, in the event of training (optional), demonstration or operational testing by way of the auxiliary regulating system 12, 13.

Within the framework of the present invention, each of said triggering means 14, 15 may be:
- either manual (on switch), so that an action from the pilot is then necessary but only in order to trigger the auxiliary regulating system 12, 13 in the event of a fault, the control of the flow rate being achieved of course automatically when said system 12, 13 is triggered;
- or automatic. This avoids the need for the pilot to release the controls in order to switch on said system 12, 13. If all the triggering means are automatic, the power regulating device 1 in accordance with the invention comprises no manual control.

It is also conceivable to envisage on each auxiliary regulating system 12, 13 in addition to said triggering means 14, 15, a second triggering means 28, 29 which is connected by a link 30, 31 to the control means 16, 17 so that one of the two triggering means 14 and 28, 15 and 29 of each auxiliary regulating system 12, 13 is automatic and the other is manual.

Additionally, as may be seen in FIG. 1, each auxiliary regulating system 12, 13 also comprises a display means 32, 33 which is connected by a link 34, 35 to the control means 16, 17 and which is capable of depicting on a standard display screen 36, 37, the state (operational, non-operational, etc.) of the corresponding auxiliary regulating system 12, 13.

According to the invention, in the event of a failure, the flow rate of the fuel is preferably controlled as a function of the discrepancy between the speeds of rotation of the two engines M1 and M2. This makes it possible to satisfy the following twofold objective:
- slow increasing or decreasing of the fuel flow rate near the preset range, so as to ensure the stability of the auxiliary regulating system 12, 13 with regard to slight disturbances; and
- fast increasing or decreasing of the fuel flow rate far from the preset range.

Figure 2:
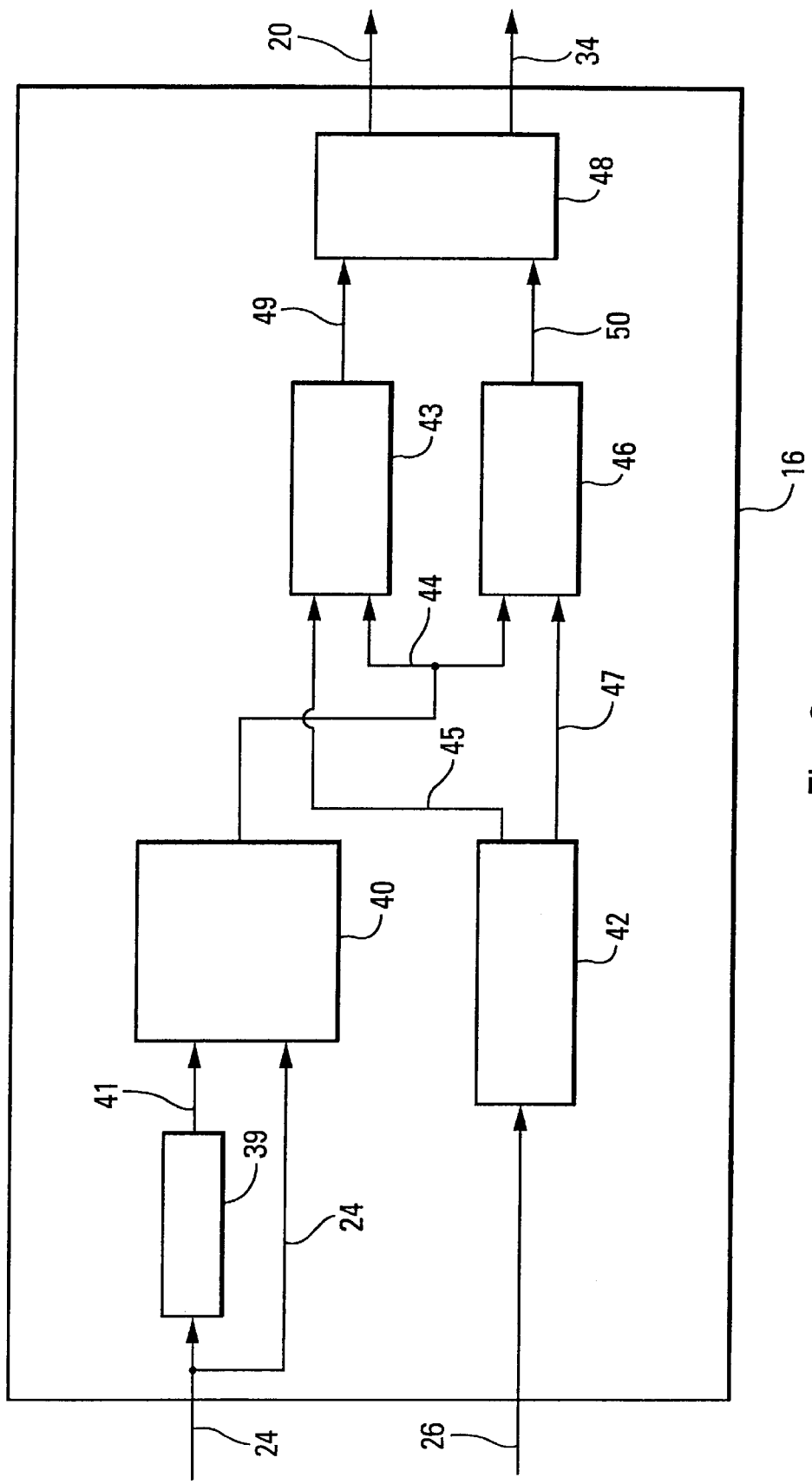
FIG. 2 is the schematic diagram of a control means forming part of a power regulating device in accordance with the invention.

In a preferred embodiment, the control means 16 comprises, as represented in FIG. 2 (of course the control means 17 is embodied in a similar manner):
- a calculation means 39 which receives the speed of rotation NG1 of the engine M1 via the link 24 and which is intended for calculating the derivative with respect to time of this same speed of rotation NG1, namely $dNG1/dt$;
- a calculation means 40 which receives the speed of rotation NG1 via the split link 24 and said derivative $dNG1/dt$ via a link 41 and which is intended for calculating the following expression E:

$$E = NG1 + K \cdot dNG1/dt,$$

K being a predefined parameter;
- a calculation means 42 which determines maximum and minimum thresholds S1 and S2 of the speed of rotation, on the basis of the speed of rotation NG2 of the engine M2, received via the link 26;
- a comparison means 43 which compares the expression E received via a link 44 with the maximum threshold S1 received via a link 45;
- a comparison means 46 which compares the expression E received via the split link 44 with the minimum threshold S2 received via a link 47; and
- a calculation means 48 which is connected by links 49 and 50 to the comparison means 43 and 46 and which determines, on the basis of the aforesaid comparisons, the control commands (delivered in the form of control voltages) which it transmits to the electric actuator 22 by way of the link 20.

It will be noted that the control means 17 is identical to this control means 16, except for the wirings to the sensors 10 and 11 of the speeds of rotation NG1 and NG2 which are swapped.

The introduction of a differentiation parameter $dNG1/dt$ makes it possible to ensure anticipation with regard to the crossing of the thresholds by the speed NG1. Moreover, the order delivered is clipped so as to guarantee that the engine controlled by the auxiliary regulating system is maintained within a normal operating range in flight.

In a particular embodiment, when the main system 2 is faulty (for a fault with the main system 6, it is sufficient to swap the speeds of rotation NG1 and NG2 indicated hereinbelow), the fuel flow rate is controlled as follows:

in a case a), for which the following conditions hold simultaneously:
NG2>60% and NG1>75%,
Δ=(|NG2−NG1|+0.9d|NG2−NG1|/dt)>1%
d/dt being the derivative with respect to time, and
(NG2−NG1)<0,
NG1 and NG2 being the speeds of rotation respectively of the engine M1, whose main regulating system 2 is faulty, and of the engine M2,
the fuel flow rate is reduced;

in a case b), for which the following conditions hold simultaneously:
NG2>70% and NG1>75%,
Δ=(|NG2−NG1|+0.9d|NG2−NG1|/dt)>1%, and
(NG2−NG1)>0,
the fuel flow rate is increased; and otherwise, in a case c), the fuel flow rate is maintained at the value which it had upon the appearance of said failure.

For this embodiment, preferably:

for case a), in order to reduce the fuel flow rate a speed of rotation of the electric actuator 22, 23 of substantially 9°/s is ordered if the discrepancy Δ is greater than 3% and a speed of rotation of the electric actuator 22, 23 of substantially 3°/s is ordered if the discrepancy Δ is less than or equal to 3%; and for case b) in order to increase the fuel flow rate, a speed of rotation of the electric actuator 22, 23 of substantially 3°/s is ordered.

Moreover, according to the invention:

the dynamics are slow when the two values NG1 and NG2 are similar so as to ensure stability;

the dynamics are slow on increasing the fuel flow rate so as to avoid pumping;

the dynamics are fast on reducing the fuel flow rate so as to avoid increases in the speed of rotation NR of the rotor during a fast drop in the collective pitch of the blades of said rotor;

the authority is limited (78 to 97% Ng); and the recentering of the backup control is automatic when the normal state is reactivated, and the backup control is switched off, if it is not used, for safety reasons.

It will be noted that the present invention can also be implemented on an aircraft provided with more than two engines: three, four, etc., engines. In this case, an auxiliary regulating system of the aforesaid type is associated with each engine, in addition to a standard main regulating system, and, in the event of a failure, the speed of rotation of the faulty engine is slaved to the speed of rotation of one of the other non-faulty engines.

What is claimed is:

1. A device for regulating the power of the engines of a rotary wing aircraft, in particular a helicopter which is furnished with at least two engines, said regulating device comprising main regulating systems associated respectively with said engines and intended to supply fuel to the associated engines respectively, which device furthermore comprises auxiliary regulating systems associated respectively with said engines, and means for determining the speeds of rotation of said engines, and in which each of said auxiliary regulating systems comprises:

at least one triggering means for triggering said auxiliary regulating system, when the main regulating system of the associated engine has failed;

a controllable supply means which is capable of supplying fuel to the associated engine; and a control means operable to automatically control said supply means so as to adjust the fuel flow rate in such a way as to slave the speed of rotation of the engine, whose main regulating system has failed, to the speed of rotation of the other engine of the aircraft.

2. The device as claimed in claim 1, wherein at least one of said supply means comprises an electric actuator and a fuel metering valve.

3. The device as claimed in claim 2, wherein said fuel metering valve comprises an anti-shutdown stop.

4. The device as claimed in claim 1, wherein at least one of said triggering means is manual.

5. The device as claimed in claim 1, wherein at least one of said triggering means is automatic.

6. The device as claimed in claim 1, wherein at least one of said auxiliary regulating systems furthermore comprises a display means operable to depict on a display screen the state of said auxiliary regulating system.

7. A process for regulating the power of the engines of a rotary wing aircraft, in particular a helicopter which is furnished with at least two engines, each of which comprises a main regulating system, said process comprising, when one of said main regulating systems has failed, controlling automatically the flow rate of fuel which is fed to the engine, whose main regulating system has failed, by way of an auxiliary regulating system in such a way as to slave the speed of rotation NG1 of this engine to the speed of rotation NG2 of the other engine.

8. The process as claimed in claim 7, wherein the flow rate of fuel is controlled in such a way that the increase or the decrease in said flow rate is variable and varies as a function of the discrepancy between the speed of rotation NG1 and the speed of rotation NG2.

9. The process as claimed in claim 7, wherein, to slave the speed of rotation NG1 to the speed of rotation NG2:

the following expression E is determined:

$$E = NG1 + K.dNG1/dt$$

in which:

K is a predetermined parameter; and dNG1/dt is the derivative with respect to time of the speed of rotation NG1;

this expression E is compared with thresholds which are defined on the basis of the speed of rotation NG2; and the slaving to be carried out is deduced on the basis of this comparison.

10. The process as claimed in claim 7, wherein the fuel flow rate is controlled as follows:

in a case a), for which the following conditions hold simultaneously:
NG2>60% and NG1>75%,
Δ=(|NG2−NG1|+0.9d|NG2−NG1|/dt)>1% d/dt being the derivative with respect to time, and
(NG2−NG1)<0, the fuel flow rate is reduced;

in a case b), for which the following conditions hold simultaneously:

NG2>70% and NG1>75%,
Δ=(|NG2−NG1|+0.9d|NG2−NG1|/dt)>1%, and
(NG2−NG1)>0, the fuel flow rate is increased; and otherwise, in a case c), the fuel flow rate is maintained at the value which it had upon the appearance of said failure.

11. The process as claimed in claim 10, wherein the fuel flow rate is controlled by controlling the speed of rotation of an electric actuator which is associated with a fuel metering valve, and wherein, for case a), in order to reduce the fuel flow rate, a speed of rotation of the electric actuator of substantially 9°/s is ordered if the discrepancy Δ is greater than 3% and a speed of rotation of the electric actuator of substantially 3°/s is ordered if the discrepancy Δ is less than or equal to 3%, and for case b) in order to increase the fuel flow rate, a speed of rotation of the electric actuator of substantially 3°/s is ordered.

12. The process as claimed in claim 11, wherein said fuel metering valve is common to a main regulating system and an auxiliary regulating system which are associated.

* * * * *